(12) United States Patent
Sekar

(10) Patent No.: US 9,690,867 B2
(45) Date of Patent: Jun. 27, 2017

(54) PAGE ROUTE SORTING USING DSP TECHNIQUES

(71) Applicant: Verizon Patent and Licensing Inc., Arlington, VA (US)

(72) Inventor: Karthikeyan X. Sekar, Kanchipuram District (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 281 days.

(21) Appl. No.: 14/206,752

(22) Filed: Mar. 12, 2014

(65) Prior Publication Data
US 2015/0261877 A1 Sep. 17, 2015

(51) Int. Cl.
*G06F 17/30* (2006.01)
*H04L 29/08* (2006.01)

(52) U.S. Cl.
CPC .... *G06F 17/30899* (2013.01); *G06F 17/3089* (2013.01); *G06F 17/30784* (2013.01); *H04L 67/02* (2013.01); *H04L 67/22* (2013.01)

(58) Field of Classification Search
CPC ......... G06F 17/30899; G06F 17/30784; G06F 17/30796; G06F 17/30749; G06F 17/30743; G06F 17/3064; G06F 17/30752; G06F 17/30817
USPC ................................ 707/736, 748, 751, 752
See application file for complete search history.

(56) References Cited

U.S. PATENT DOCUMENTS

| | | | | |
|---|---|---|---|---|
| 7,051,029 B1 * | 5/2006 | Fayyad | ............ | G06F 17/30876 |
| 2008/0137915 A1 * | 6/2008 | Kim | ....................... | B41J 2/2142 382/112 |

* cited by examiner

*Primary Examiner* — Thu-Nguyen Le

(57) ABSTRACT

A server device may store information identifying multiple routes. Each of the multiple routes may identify a sequence in which pages were individually selected. The server device may determine respective time-domain functions for each of the multiple routes. Each of the time-domain functions may represent a series of data points corresponding to the sequence in which the web pages were selected. The server device may determine respective frequency-domain functions based on the respective time-domain functions; determine route metrics for each of the multiple routes based on the respective frequency-domain functions; sort the multiple routes based on the route metrics; and store or output information regarding the sorted multiple routes.

20 Claims, 10 Drawing Sheets

610 →

| Route ID 1 Count: 5 ||
|---|---|
| Sequence ID | Page ID |
| 1 | P5 |
| 2 | P4 |
| 3 | P1 |

| Route ID 2 Count: 2 ||
|---|---|
| Sequence ID | Page ID |
| 1 | P6 |
| 2 | P2 |
| 3 | P4 |

| Route ID 3 Count: 3 ||
|---|---|
| Sequence ID | Page ID |
| 1 | P5 |
| 2 | P2 |

| Route ID 4 Count: 3 ||
|---|---|
| Sequence ID | Page ID |
| 1 | P5 |
| 2 | P2 |

| Route ID 5 Count: 2 ||
|---|---|
| Sequence ID | Page ID |
| 1 | P3 |
| 2 | P2 |
| 3 | P4 |

| Sequence ID | Page ID | Seq. Page Count | Total Page Count |
|---|---|---|---|
| 1 | P5 | 11 | 11 |
| 1 | P6 | 2 | 2 |
| 1 | P3 | 2 | 2 |
| 2 | P2 | 10 | 10 |
| 2 | P4 | 5 | 9 |
| 3 | P4 | 6 | 9 |
| 3 | P1 | 5 | 5 |

| Page ID | Amplitude |
|---|---|
| P5 | 1 |
| P6 | 2 |
| P3 | 3 |
| P2 | 4 |
| P4 | 5 |
| P1 | 6 |

Fig. 6C

PAGE ROUTE SORTING USING DSP TECHNIQUES

BACKGROUND

Users may browse web pages in order to receive digital content, order products and/or services, etc. When browsing web pages, a particular user may routinely select to access certain web pages in a particular sequence (e.g., when re-ordering products/services, when re-requesting particular content, etc.). User experience, when browsing web pages, may suffer when the web pages present content that the user may not be interested in, and when the user may need to select multiple different pages in order to find content of interest to the user.

BRIEF DESCRIPTION OF THE DRAWINGS

FIG. 6A illustrates an example data structure that may store route information for routes associated with a particular user;

FIG. 6B illustrates an example data structure that may store amplitude data for pages;

FIG. 6C illustrates an example data structure that may store amplitude assignment for pages;

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may determine a user's webpage browsing pattern based on the use of digital signal processor (DSP) processing techniques applied to the user's webpage browsing history. The user's determined browsing pattern may be used to generate a customized browsing experience for the user based on the user's webpage browsing pattern.

Figure 1:
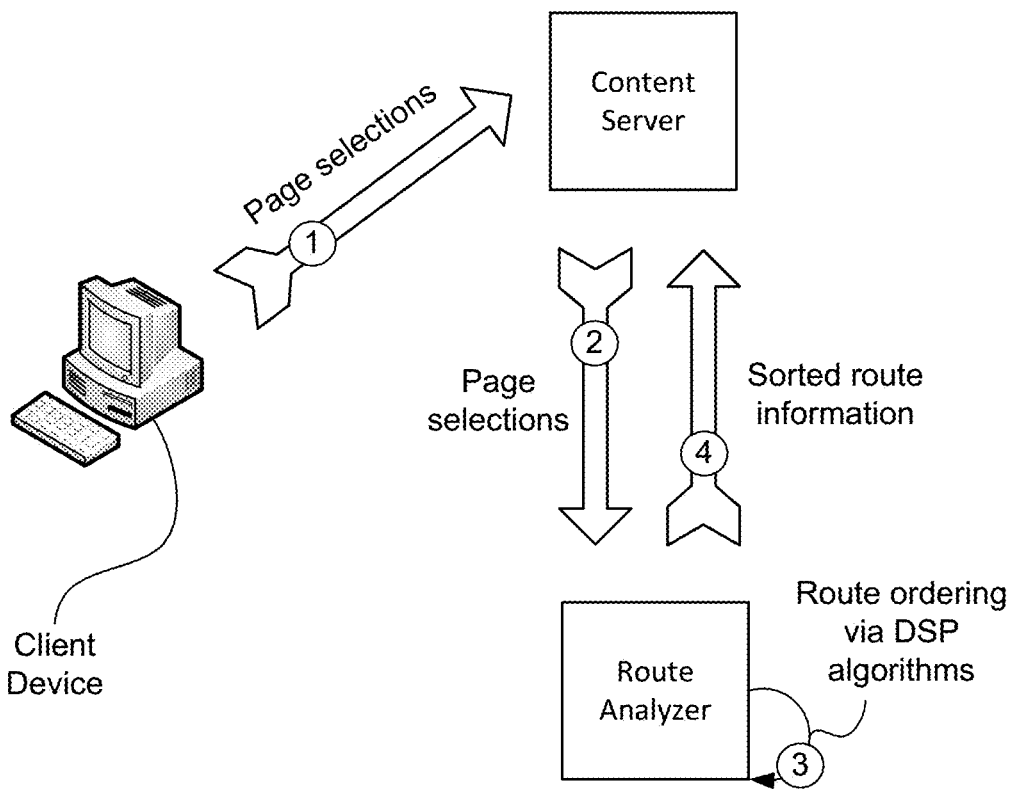
FIG. 1 illustrates an example overview of an implementation described herein.

FIG. 1 illustrates an example overview of an implementation described herein. In FIG. 1, a user may use a client device to browse through a website associated with a content server. When browsing through the website, the user may select a series of webpages (hereinafter referred to as "pages") in a particular sequence (arrow 1). As an example, the user may select page 2, page 5, and page 9, respectively, in that sequence when browsing through the website. As further shown in FIG. 1, a route analyzer may receive the user's page selections, for example, from the content server (arrow 2).

Based on receiving the page selections, the route analyzer may assign a route identifier (ID) that identifies the particular sequence in which the user selects pages. For example, the route analyzer may assign the route ID "route 1" corresponding to the selections for page 2, page 5, and page 9 in that sequence. The route analyzer may store multiple route IDs, with each route ID identifying a different sequence of page selections made by the user during a particular browsing session.

The route analyzer may also determine metrics based on the page selections. One metric that the route analyzer may determine may include a number of times that a route has been taken by the user. For example, if the user has selected page 2, page 5, and page 9 in one browsing session, and then later selects page 2, page 5, and page 9 in another browsing session, the route analyzer may store information that identifies that "route 1" has been taken twice. Another metric that the route analyzer may determine is an amplitude value for each page. The amplitude values may be based on a number of times that a particular page has been selected first in a route, a number of times that the particular page has been selected second in a route, a number of times that the particular page has been selected third in a route, and so on. Other metrics that the route analyzer may determine may include a total number of times that each page has been selected among all routes taken by the user.

Based on such metrics, the route analyzer may use DSP processing techniques (arrow 3) to determine an order in which the routes should be sorted (e.g., sorted route information). The route analyzer may then store or output the sorted route information (arrow 4). The sorted route information may be used to arrange pages and/or content included in the pages, for example, in a manner that may streamline the user's browsing experience.

Figure 2:
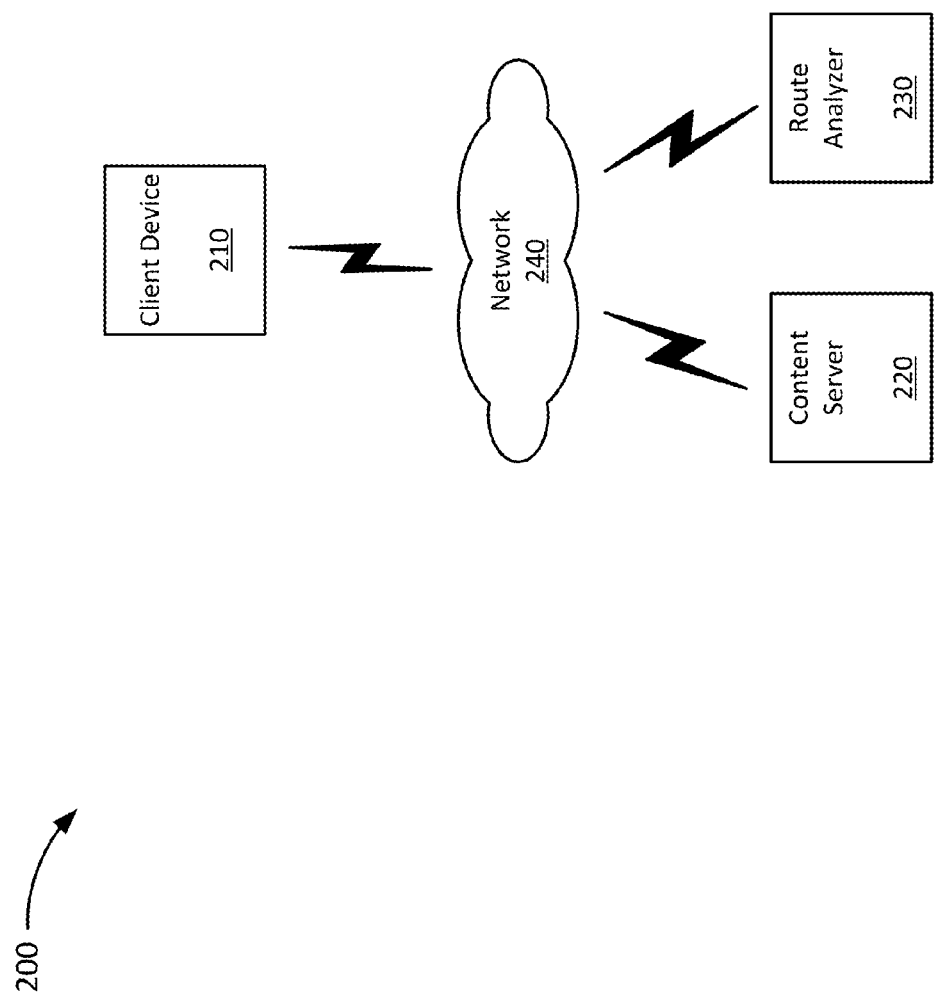
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include client devices 210-1 through 210-M (where M is greater than or equal to 1), content server 220, route analyzer 230, and network 240.

Client device 210 may include a device capable of communicating via a network, such as network 240. For example, client device 210 may correspond to a mobile communication device (e.g., a smart phone or a personal digital assistant (PDA)), a portable computer device (e.g., a laptop or a tablet computer), a desktop computing device, or some other type of computing device. In some implementations, client device 210 may access pages associated with content server 220.

Content server 220 may include one or more computing devices, such as a server device or a collection of server devices. In some implementations, content server 220 may store content that client device 210 may access via pages hosted by content server 220. In some implementations, content server 220 may host pages associated with an e-commerce website, a digital content platform, or the like.

Route analyzer 230 may include one or more computing devices, such as a server device or a collection of server devices. In some implementations, route analyzer 230 may receive session information that identifies page selections made by a particular user. The session information may identify a particular content server 220 associated with the page selections, page IDs of the selected pages, and information identifying the particular user (e.g., user login information, an internet protocol (IP) address of client device 210 used by the particular user, etc.). Based on the session information, route analyzer 230 may determine metrics that may be used as inputs into a DSP algorithm implemented by route analyzer 230. Route analyzer 230 may determine, based on executing the DSP algorithm, sorted route information (e.g., an order in which routes should be sorted). Route analyzer 230 may determine, based on the sorted route information, an arrangement of pages and/or content included in the pages in a manner that may streamline or otherwise improve the user's browsing experience. In some implementations, route analyzer 230 may provide the sorted route information (e.g. to content server 220) so that content server 220 may use the sorted route information to arrange the pages and/or determine content to include in the pages.

Network 240 may include one or more wired and/or wireless networks. For example, network 240 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 240 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in environment is not limited to what is shown in FIG. 2. In practice, environment 200 may include additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
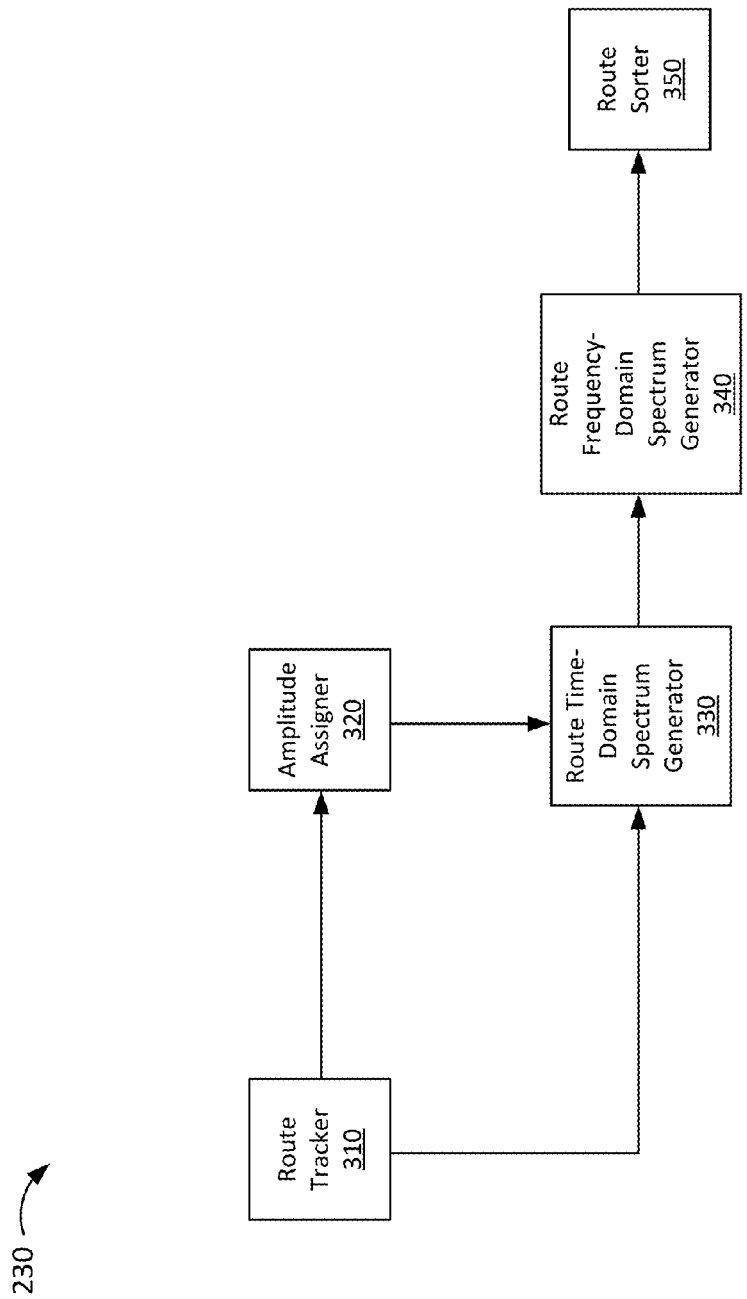
FIG. 3 illustrates example functional components of a route analyzer.

FIG. 3 illustrates example functional components of a route analyzer. As shown in FIG. 3, route analyzer 230 may include route tracker 310, amplitude assigner 320, route time-domain spectrum generator 330, route frequency-domain spectrum generator 340, and route sorter 350.

Route tracker 310 may receive session information identifying a user and page selections made by the user. Based on the session information, route tracker 310 may determine a route ID corresponding to the sequence of page selections made by the user. If a route ID that identifies the sequence of page selections does not exist, route tracker 310 may generate a route ID and may store information associating the route ID with the sequence of page selections. Route tracker 310 may continuously track route information that identifies a number of times that routes have been taken.

Amplitude assigner 320 may receive the route information and may determine amplitude values for the pages identified in the route information. The amplitude values may be based on a number of times that a particular page has been selected first in a route, a number of times that the particular page has been selected second in a route, a number of times that the particular page has been selected third in a route, and so on. Some examples of determining the amplitude values for the pages are described below with respect to FIGS. 4, 5, 6A and 6B.

Figure 7A:
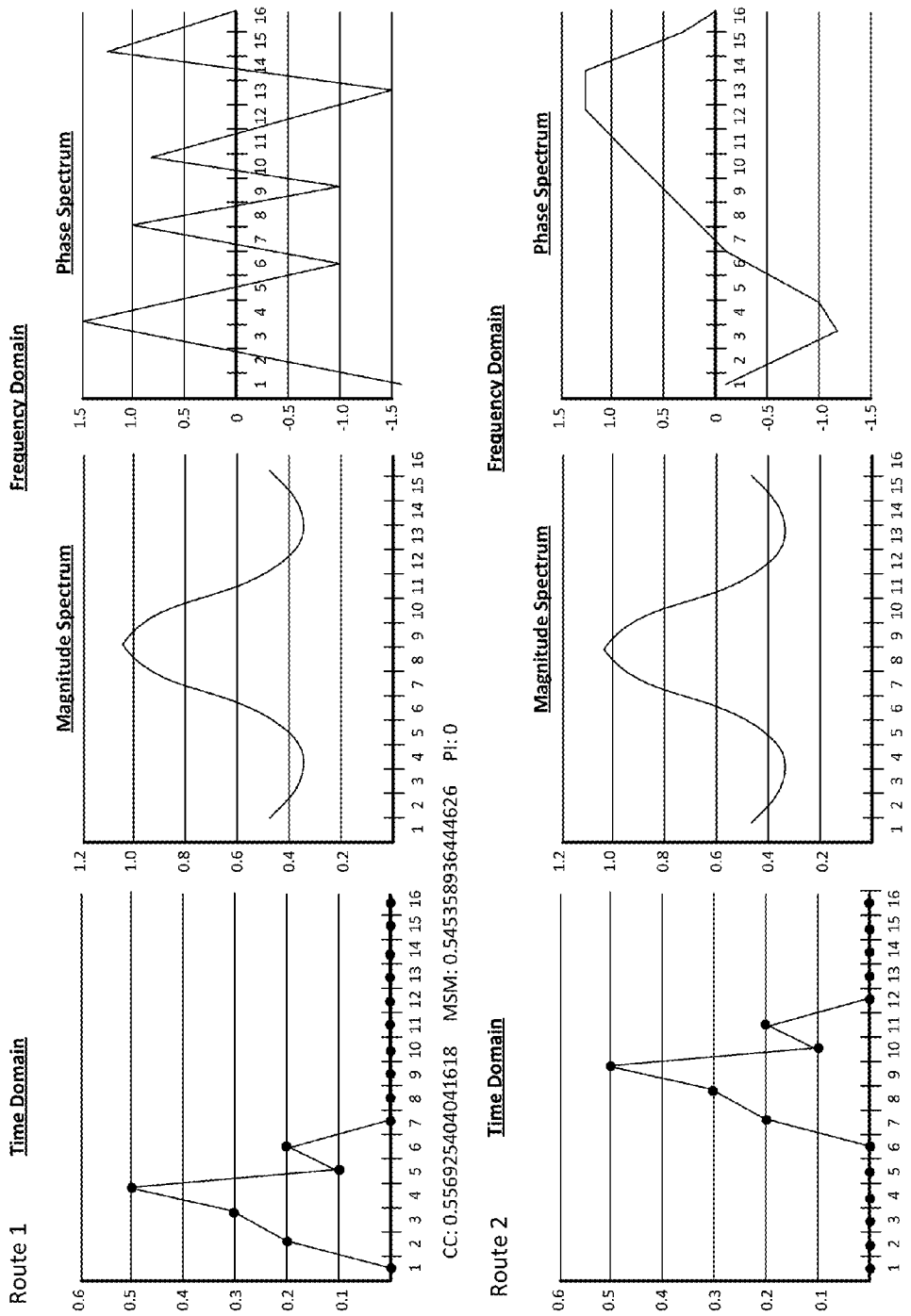
FIGS. 7A and 7B illustrate example spectrums of routes in the time and frequency domains.
Figure 7B:
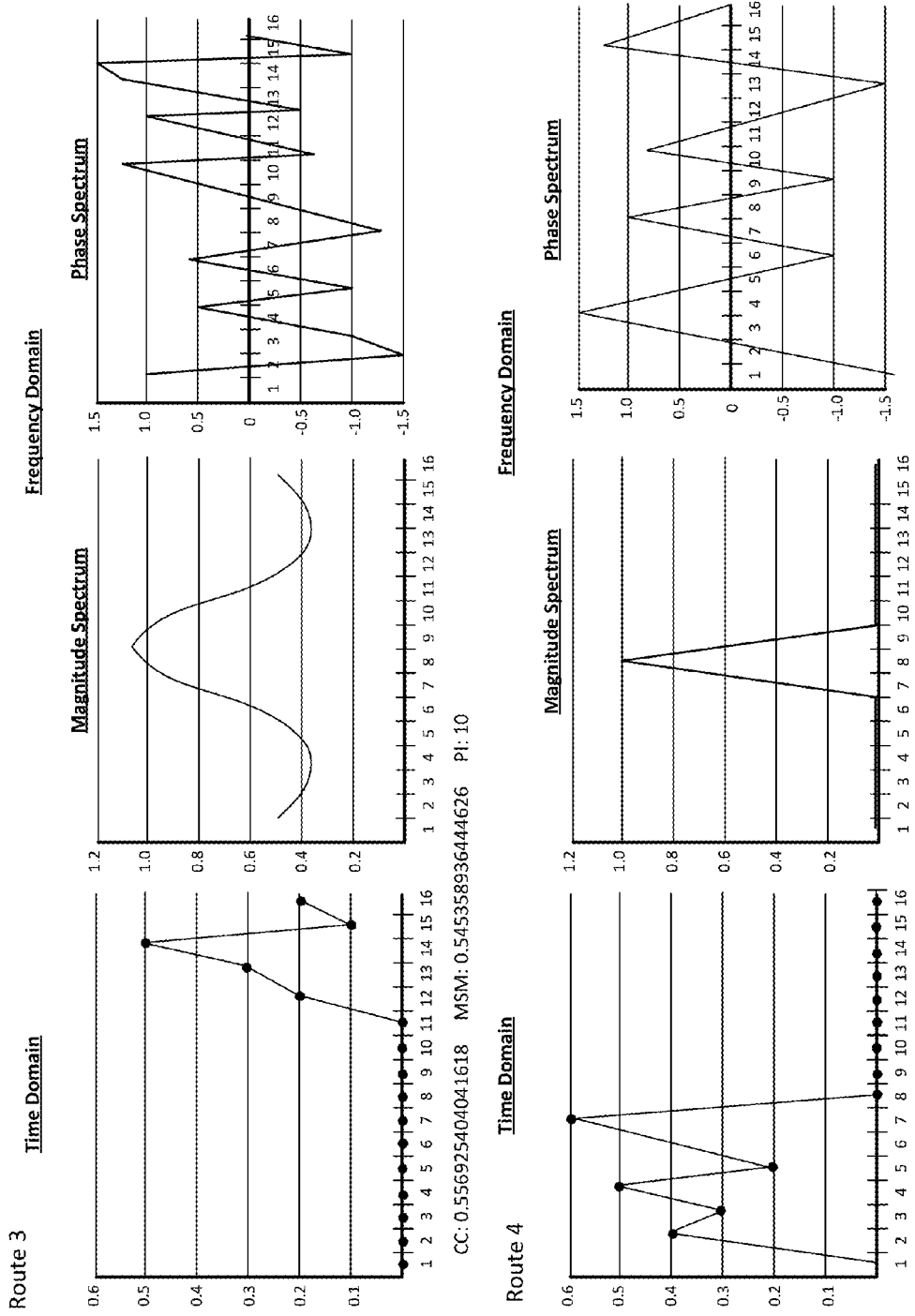

Route time-domain spectrum generator 330 may receive route information from route tracker 310 and amplitude values from amplitude assigner 320. Based on the route information and the amplitude values, route time-domain spectrum generator 330 may generate a spectrum of each route in the time domain. For example, for a particular route (e.g., a route identified by the route ID "route 1"), route time-domain spectrum generator 330 may generate a spectrum including data points, where each data point identifies a time instance in which a page was selected. As an example, route time-domain spectrum generator 330 may generate a spectrum having a first data point representing that at a first time instance, a page having a first amplitude value was selected, a second data point representing that at a second time instance, a page having a second amplitude value was selected, etc. In a similar manner, route time-domain spectrum generator 330 may generate a spectrum for each route. Route time-domain spectrum generator 330 may also generate a time-domain function for each route, based on the data points, of the spectrum in terms of amplitude value as a function of time. Some examples of spectrums in the time domain are illustrated in FIGS. 7A and 7B and described below.

Route frequency-domain spectrum generator 340 may receive the time-domain function from route time-domain spectrum generator 330, and may convert the time-domain function to a frequency-domain function (e.g., based on a Fast Fourier Transform (FFT) or similar technique). Based on converting the function, route frequency-domain spectrum generator 340 may generate a magnitude spectrum and phase spectrum (examples of which are illustrated in FIGS. 7A-7C, and described below). Route frequency-domain spectrum generator 340 may also determine a correlation coefficient (CC) value, a magnitude spectrum mean (MSM) value, and/or a phase index (PI) value for each route. The CC value may identify a degree in which the magnitude spectrum of a particular route correlates with the magnitude spectrum of a base route (e.g., a route that has been taken the most by the user). The MSM value may identify an average of the amplitude values in a particular route. The PI value may identify a shift or time delay in a page visit between two routes having the same CC value and the same MSM value.

Route sorter 350 may receive the CC, MSM, and PI values and may sort the routes, first, by the CC value, second, by the MSM value, and third, by the PI values. Alternatively, route sorter 350 may sort the routes in some other order. Based on sorting the routes, route sorter 350 may store or provide information identifying the sorted routes.

Figure 4:
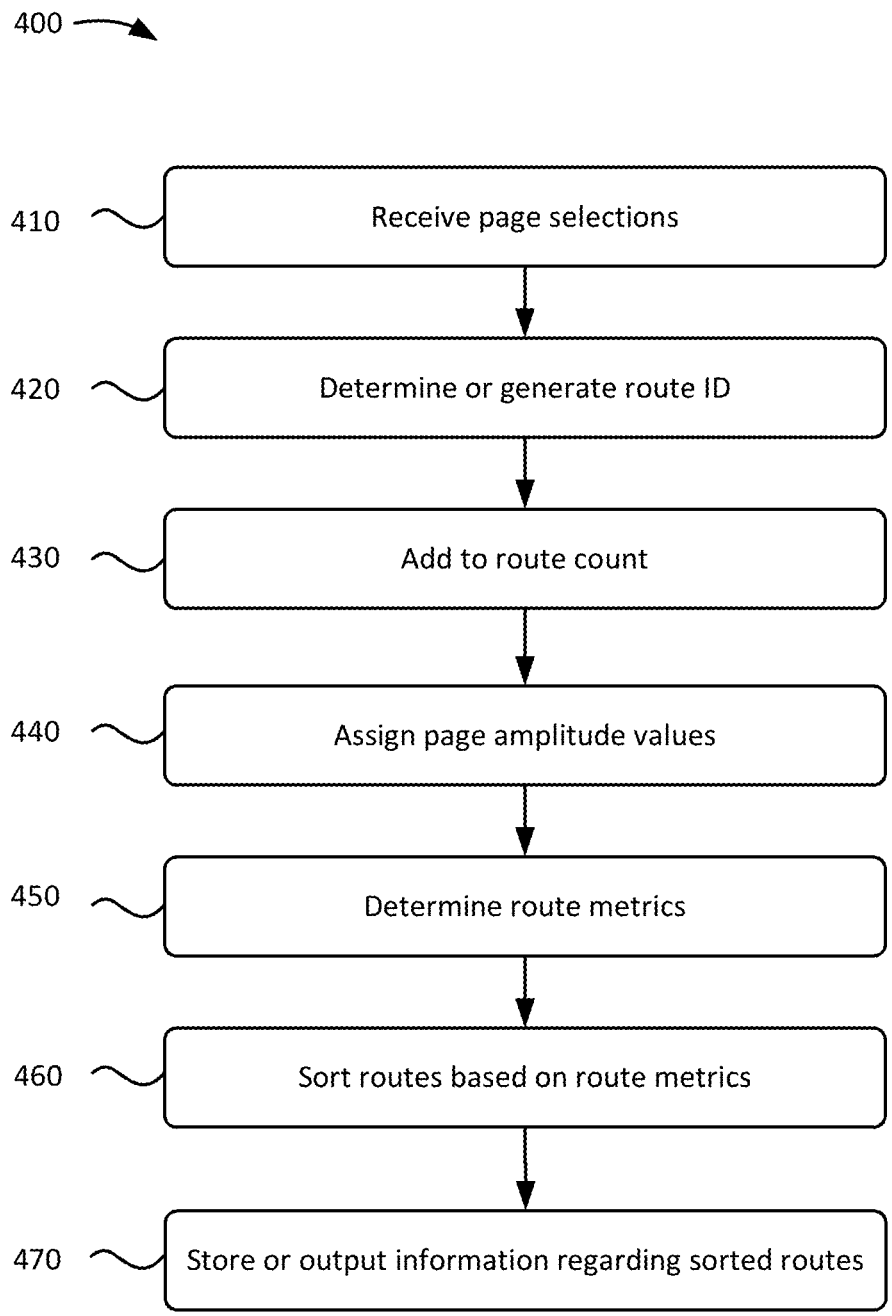
FIG. 4 illustrates a flowchart of an example process for determining sorted route information.

FIG. 4 illustrates a flowchart of an example process 400 for determining sorted route information. In some implementations, process 400 may be performed by route analyzer 230. In some implementations, some or all of blocks of process 400 may be performed by other devices in environment 200 (e.g., client device 210 and/or content server 220), in addition to, or in lieu of, route analyzer 230. In FIG. 4, assume that a user accesses a website, associated with content server 220, as part of a website browsing session.

As shown in FIG. 4, process 400 may include receiving page selections (block 410). For example, route analyzer 230 may receive page selections made by a user of client device 210 as the user browses the website associated with content server 220 via a browsing session. In some implementations, the page selections may identify a sequence in which pages (identified by page IDs) were selected by the user. As an example, the page selections may indicate that the page IDs of "page 2," "page 5" and "page 9" were selected in that sequence. When receiving the page selections, route analyzer 230 may also receive information identifying the user (e.g., via the browsing session).

Process 400 may also include determining or generating a route ID (block 420). For example, route analyzer 230 may determine a route ID corresponding to the sequence of page selections. As described above, route analyzer 230 may store one or more route IDs that each identify a sequence of page selections that have been previously made by the user. Route analyzer 230 may determine the particular route ID that corresponds to the received page selections and the corresponding sequence. In the above example, route analyzer 230 may determine a particular route ID corresponding to the page selections of "page 2," "page 5" and "page 9" in that respective sequence. If route analyzer 230 is unable to determine the particular route ID (e.g., when a particular route ID does not exist for the sequence of page selections), route analyzer 230 may generate a new route ID and store information associating the page selections and the sequence of the page selections with the newly generated route ID.

Process 400 may further include adding to a route count (block 430). For example, route analyzer 230 may store information identifying a number of times that a particular route has been taken by a user (e.g., the number of times that a particular sequence of page selections have been made by the user). Based on determining or generating the route ID, route analyzer 230 may add to the number of times that the particular route has been taken. As an example, assume that route analyzer 230 determined (e.g., in block 420), that the page selections and corresponding sequence corresponded to the route ID "Route 123." Further, assume that route analyzer 230 stores information identifying that "Route 123" has been taken six times. Given these assumptions, route analyzer 230 may add to the number of times that "Route 123" has been taken by updating a route count for "Route 123" from six to seven. If route analyzer 230 generates a new route ID in block 420, route analyzer 230 may store a route count of one for the newly generated route ID. An example of a data structure that stores route information (e.g., a sequence of page selections, and a corresponding route count) is described below with respect to FIG. 6A.

Process 400 may also include assign page amplitude values (block 440). For example, route analyzer 230 may assign amplitude values for each page selected by the user. Route analyzer 230 may assign the amplitude values based on route information and route counts maintained by route analyzer 230. For example, route analyzer 230 may assign the amplitude values based on a number of times that a particular page has been selected first in a group of routes (e.g., a total group of routes taken by the user). Further, route analyzer 230 may assign the amplitude values based on a number of times that the particular page has been selected second in the group of routes, a number of times that the particular page has been selected third in the group of routes, and so on. In one implementation, an amplitude value may be assigned to each page of a website.

In some implementations, route analyzer 230 may assign amplitude values on any scale, such as from a scale from 1 to 2. For the page that has been selected first in the group of routes the most, route analyzer 230 may assign the lowest value on the scale. For the page that has been selected first in the group of routes the second most, route analyzer 230 may assign the second highest value on the scale, and so on.

As an example, route analyzer 230 may assign three amplitude values to three pages (e.g., the pages having the page IDs "Page 1," "Page 2," and "Page 3"). Assume that the page having the page ID "Page 1" has been selected first, three times in a group of six total routes taken by the user. Further, assume that the page having the page ID "Page 2" has been selected first, one time in the group of six routes. Further, assume that the page having the page ID "Page 3" has been selected first, two times in the group of routes. Given these assumptions, route analyzer 230 may assign the lowest amplitude value to "Page 1," the second lowest amplitude value to "Page 3," and the third lowest amplitude value to "Page 2." As an example, route analyzer 230 may assign the amplitude 1 to "Page 1," the amplitude 1.5 to "Page 3," and the amplitude 2 to "Page 2." Some additional examples of determining the amplitude values for pages are described below with respect to FIGS. 5, 6A, and 6B.

Process 400 may further include determining route metrics (block 450). For example, route analyzer 230 may determine route metrics for each route associated with the user, such as a CC value, an MSM value, and/or a PI value. To determine the route metrics, route analyzer 230 may generate, for reach route, a time-domain function and a corresponding frequency-domain function for each route. When generating the time-domain function, route analyzer may generate a series of page selections (represented by amplitude values) in units of time. For example, route analyzer 230 may generate a series of data points, where each data point identifies a time instance in which a page was selected. As an example, for one route, route analyzer 230 may generate a series having a first data point representing that at a first time instance, a page having a first amplitude value was selected, a second data point representing that at a second time instance, a page having a second amplitude value was selected, etc. In a similar manner, route analyzer 230 may generate a series for each route.

Route analyzer 230 may generate the time-domain function for each route, based on the data points, of the series in terms of amplitude value as a function of time. For example, route analyzer 230 may generate the time-domain function based on an interpolation technique, such as a DSP interpolation technique. Additionally, or alternatively, route analyzer may generate the time-domain function based on some other interpolation technique, such as Lagrange interpolation, piecewise interpolation, linear interpolation, polynomial interpolation spline interpolation, and/or some other type of interpolation technique.

Route analyzer 230 may convert the time-domain function to a frequency-domain function (e.g., based on an FFT or similar technique). Based on converting the function, route analyzer 230 may generate a magnitude spectrum and phase spectrum. Route analyzer 230 may then determine CC value, an MSM value, and/or a PI value for each route. The CC value may identify a degree in which the magnitude spectrum of a particular route correlates with the magnitude spectrum of a base route (e.g., a route that has been taken the most by the user). The MSM value may identify an average of the amplitude values in a particular route. The PI value may identify a shift or time delay in a page visit between two routes having the same CC value and the same MSM value. In some implementations, route analyzer 230 may determine an MSM value when multiple routes have the same CC value. In some implementations, route analyzer 230 may determine the PI value when multiple routes have the same CC value and the same MSM value.

Process 400 may further include sorting the routes based on the route metrics (block 460). For example, route analyzer 230 may sort the routes first, by the CC value, second, by the MSM value, and third, by the PI values. Alternatively, route sorter 350 may sort the routes in some other order.

Process 400 may also include storing or outputting information regarding the sorted routes (block 470). For example, route analyzer 230 may storing the information regarding the sorted routes (e.g., sorted route information), or output the sorted route information. In some implementations, the sorted route information may be used to arrange the pages and/or content included in the pages, for example, in a manner that may streamline the user's browsing experience. For example, when the user accesses the website at a later time (e.g., as part of a subsequent browsing session), content and/or pages may be presented based on the sorted route information. For example, pages in frequently visited routes may be listed towards the top of the website. Additionally, or alternatively (e.g., when the website includes an e-commerce website), product recommendations may be provided to the user based on the sorted route information. Additionally, or alternatively, the user's interests may be determined based on the sorted route information, and/or based on a route currently being taking by a user. Further, product recommendations may be provided based on the user's interests. In some implementations, product discounts may be offered based on the sorted route information. In some implementations, a user's product order pattern may be correlated with the sorted route information to determine how differences in routes impact the user's product order pattern.

While process 400 is described in terms of sorting routes for a particular user, in practice, routes may be sorted for a group of users. For example, page selections may be aggregated for multiple or all users of a website. Aggregated route information and aggregated route metrics may be determined based on the aggregated page selections, and the routes may be sorted based on the aggregated route metrics.

Figure 5:
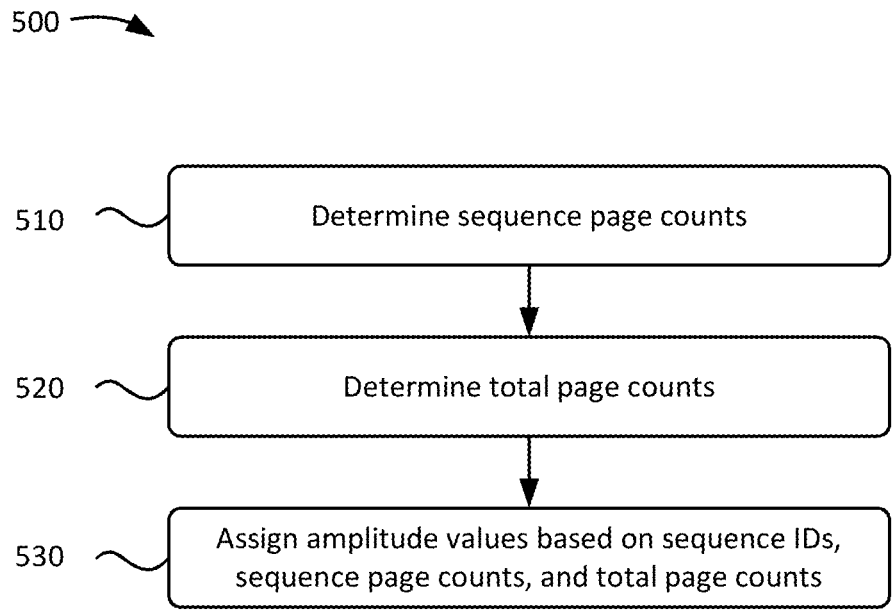
FIG. 5 illustrates a flowchart of an example process for assigning page amplitude values.

FIG. 5 illustrates a flowchart of an example process 500 for assigning page amplitude values. In some implementations, process 500 may be performed by route analyzer 230 and may correspond to processes associated with process block 440. In some implementations, some or all of blocks of process 500 may be performed by other devices in environment 200 (e.g., client device 210 and/or content server 220), in addition to, or in lieu of, route analyzer 230.

As shown in FIG. 5, process 500 may include determining sequence page counts (block 510). For example, route analyzer 230 may determine a number of times that pages have been selected first in a group of routes, second in a group of routes, third in a group of routes, etc. In some implementations, route analyzer 230 may determine the sequence page counts based on route information stored by route analyzer 230 (e.g., information identifying pages selected in respective routes, and a number of times that the respective routes have been taken).

In some implementations, route analyzer 230 may store (e.g., in an amplitude data structure) sequence IDs, corresponding page IDs, and corresponding sequence page counts. As an example, one entry in the amplitude data structure may store the sequence ID of 1, a corresponding page ID of "Page 5" and a corresponding sequence page count of 11 to indicate that, in a group of routes associated with a particular user, "Page 5" has been selected first 11 times. Similarly, route analyzer 230 may store, in the amplitude data structure, the sequence ID of 1 with a corresponding page ID "Page 6", and a corresponding sequence page count of 2 to indicate that, in the group of routes, "Page 6" has been selected first, 2 times. Similarly, route analyzer 230 may store, in the amplitude data structure, the sequence ID of 2 with a corresponding page ID "Page 2", and a corresponding sequence page count of 10 to indicate that, in the group of routes, "Page 2" has been selected second, 10 times.

Process 500 may further include determining total page counts (block 520). For example, route analyzer 230 may determine a total number of times that pages have been selected in the group of routes, regardless of the sequence in which the pages were selected. As an example, assume that "Page 4" was selected in routes having the route IDs "Route ID 1," "Route ID 2," and "Route ID 5." Further, assume that the counts for "Route ID 1," "Route ID 2," and "Route ID 5" are 5, 2, and 2, respectively. Given these assumptions, route analyzer 230 may determine that "Page 4" has been selected a total of 9 times. In a similar manner, route analyzer 230 may determine total page counts for all pages in the group of routes associated with the user.

Route analyzer 230 may store information identifying a total page count for a particular page in the amplitude data structure that stores the sequence ID, the page ID, and the sequence page count. As a result, each entry in the data structure may store a sequence ID, a page ID, a sequence page count, and a total page count. As an example, one entry in the amplitude data structure may store the sequence ID 1, the page ID "Page 5," the sequence page count 11, and the total page count 11 to indicate that, in a group of routes, Page 5 was selected first 11 times and was selected a total of 11 times. As another example, another entry in the amplitude data structure may store the sequence ID 2, the page ID "Page 4," the sequence page count 5, and the total page count 9 to indicate that, in a group of routes, Page 4 was selected second 5 times and was selected a total of 9 times. An example of the amplitude data structure is shown in FIG. 6B.

Process 500 may also include assigning amplitude values based on the sequence IDs, sequence page counts, and total page counts (block 530). For example, route analyzer 230 may assign the amplitude values by sorting the amplitude data structure by sequence ID, sequence page count, and total page count. Based on sorting the amplitude data structure, route analyzer 230 may determine the page that was selected first in the group of routes the most, the page that was selected the first in the group of routes the second most, and so on. Further, route analyzer 230 may determine the page that was selected second in the group of routes the most, the page that was selected second in the group of routes the second most, and so on. Further, route analyzer 230 may determine the page that was selected third in the group of routes the most, the page that was selected third in the group of routes the second most, and so on. If multiple pages were selected first in the group of routes the same number of times, the total page count may be used to prioritize which page is sorted first.

Once the amplitude data structure has been sorted, route analyzer 230 may assign amplitudes, on any scale (e.g., a scale from 1 to 2), in inverse order. For example, route analyzer 230 may assign the amplitude of 1 to the page that was selected first in the group of routes the most, and the amplitude of 2 to the page that was selected last the least. An example of sorting the amplitude data structure is shown in FIG. 6B. Additional examples of determining sequence page counts, total page counts, and amplitude assignments are described below with respect to FIGS. 6A-6B.

FIG. 6A illustrates an example data structure 610 that may store route information for routes associated with a particular user. In some implementations, data structure 610 may be stored in a memory of route analyzer 230. In some implementations, data structure 610 may be stored in a memory separate from, but accessible by, route analyzer 230 (e.g., a "cloud" storage device). In some implementations, data structure 610 may be stored by some other device in environment 200, such as client device 210 and/or content server 220. A particular instance of data structure 610 may contain different information and/or fields than another instance of data structure 610.

As shown in FIG. 6A, data structure 610 may store information for multiple routes taken by a particular user when browsing a particular website during a particular browsing session. For example, data structure 610 may store a route ID for each route (e.g., "Route ID 1," "Route ID 2," "Route ID 3," "Route ID 4," and "Route ID 5"). For each route, data structure 610 may store a sequence in which pages were selected, and a route count (e.g., a number of times the route was taken). For example, for "Route 1," data structure 610 may store a route count of 5, a list of sequence IDs (e.g., 1, 2, and 3), and a list of pages corresponding to the sequence IDs (e.g., "P5," "P4," and "P1") to indicate that, in "Route 1," page "P5" was selected first, page "P4" was selected second, and page "P1" was selected third. Similarly, data structure 610 may store route information for "Route ID 2," "Route ID 3," "Route ID 4," and "Route ID 5." In some implementations, information stored by data structure 610 may be used to identify a route corresponding to page selections made by the user during a particular browsing session (e.g., as described above in process block 420). Information stored by data structure 610 may be updated to add to the route count. Additionally, or alternatively, data structure 610 may be updated to store information for a new route not previously defined.

Referring to FIG. 6B, each entry in data structure 620 (e.g., an amplitude data structure) may store a sequence ID, a page ID, a sequence page count, and a total page count. Information stored by data structure 620 may be based on information stored by data structure 610. For example, referring to data structure 610 in FIG. 6A, page "P5" was selected first in "Route ID 1," "Route ID 3," and "Route ID 4." Also "Route ID 1," "Route ID 3," and "Route ID 4" have respective route counts of 5, 3, and 3. Thus, page "P5" was selected first, 11 times among the group of routes stored by data structure 610. Further, page "P5" was selected 11 total times in the group of routes. In an example entry shown in FIG. 6B, data structure 620 may store a sequence ID of 1, a page ID of "P5," a sequence page count of 11, and a total page count of 11 to indicate that, in a group of routes (e.g., Route IDs 1 through 5 as shown in FIG. 6A), "P5" was selected first, 11 times, and 11 total times. In a similar manner, data structure 620 may store information to identify a number of times that pages were selected first in the group of routes, second in the group of routes, third in the group of routes, and so on. Further, data structure 620 may store information to identify a total number of times that pages were selected in the group of routes. The page IDs, identified in data structure 620 may be sorted, first by sequence ID, second by sequence page count, and third by total page count. In the example shown in FIG. 6B, page "P5" may be listed first since page "P5" was selected first the most, and page "P1" may listed last since page "P1" was selected last the least.

Referring to FIG. 6C, data structure 630 may store the sorted page IDs and amplitude assignments for each page ID. In the example shown in FIG. 6C, data structure 630 may store amplitudes on a scale from 1 to 6. Amplitude values may be assigned in ascending order based on the sorting of the page IDs. For example, amplitude values of 1, 2, 3, 4, 5, and 6 may be respectively assigned to pages "P5," "P6," "P3," "P2," "P4," and "P1."

FIGS. 7A and 7B illustrate example graphs of routes in the time and frequency domains. In FIGS. 7A and 7B, the graphs of four routes are shown (e.g., "Route 1," "Route 2," "Route 3," and "Route 4"). In FIGS. 7A and 7B, assume that route analyzer 230 has determined amplitude values for pages selected by a particular user, and that "Route 4" is identified as a base route (e.g., the route out of the four routes that has been taken the most by the user). In the time domain, the spectrum shows page selections (expressed in terms of page amplitude) made by a user in a particular sequence. In the example shown in FIG. 7A for "Route 1", the page having the amplitude value of zero was selected first, the page having the amplitude value of 0.2 was selected second, the page having the amplitude value of 0.3 was selected third, and so on. Based on this time-domain series, route analyzer 230 may determine a function, and convert the function from the time domain to the frequency domain.

Once in the frequency domain, a magnitude spectrum and phase spectrum of the route may be generated, and route analyzer 230 may determine route metrics for each route (e.g., a CC value, an MSM value, and/or a PI value). Route analyzer 230 may determine a CC value of each route by correlating the magnitude spectrum of the base route with the magnitude spectrum of each of the other routes. For example, the CC value of the base route (e.g., "Route 4") is 1 (e.g., the base route has a correlation of 1 with itself), and the CC value of "Route 1" may be determined by correlating the magnitude spectrum of the base route and magnitude spectrum of "Route 1." For example, the CC value of "Route 1" may be determined based on the Pearson Correlation Coefficient Formula and/or based on some other formula or algorithm. Similarly, route analyzer 230 may determine the CC values of "Route 2" and "Route 3" by correlating the magnitude spectrum of "Route 2" and "Route 3" with the magnitude spectrum of "Route 4."

In some implementations, route analyzer 230 may determine an MSM value for routes that have the same CC value. Further, route analyzer 230 may determine a PI value for routes that have the same CC and MSM values. For example, two routes may have the same CC and MSM values when page selections, in the routes, match, but when a time-delay between the page selections exist. As described above, route analyzer 230 may determine the MSM value for a route by taking the mean of the amplitude values in the route. Route analyzer 230 may determine the PI value of a particular route by comparing the phase spectrum of a secondary base route with that of the particular route. For example, assume as shown in FIGS. 7A to 7B, "Route 1", "Route 2," and "Route 3" each have the same CC and MSM values. Route analyzer 230 may determine that out of these three routes, "Route 1" has been taken the most, and thus, the PI of route "Route 1" is determined to be zero. Route analyzer 230 may determine the PI value of "Route 2" by comparing the phase spectrum of "Route 2" against that of "Route 1." Similarly, route analyzer 230 may determine the PI value of "Route 3" by comparing the phase spectrum of "Route 3" against that of "Route 1." The PI value may identify a shift in time or a delay in the page selection sequence for the Routes that have the same CC value and MSM value.

As described above route analyzer 230 may sort the routes based on the CC value, MSM value, and PI value. For example, route analyzer 230 may sort the routes first by the CC values, then by the MSM values, and finally by the PI values. Alternatively, route analyzer 230 may sort the routes in some other order.

As described above, the sorted route information may be used to arrange the pages and/or content included in the pages, for example, in a manner that may streamline a user's (or group of users') browsing experience. For example, when the user accesses the website at a later time (e.g., as part of a subsequent browsing session), content and/or pages may be presented based on the sorted route information. For example, pages in frequently visited routes may be listed towards the top of the website. Additionally, or alternatively (e.g., when the website includes an e-commerce website), product recommendations may be provided to the user based on the sorted route information. Additionally, or alternatively, the user's interests may be determined based on the sorted route information, and/or based on a route currently being taking by a user. Further, product recommendations may be provided based on the user's interests. In some implementations, product discounts may be offered based on the sorted route information. In some implementations, a user's product order pattern may be correlated with the sorted route information to determine how differences in routes impact the user's product order pattern.

While particular examples are shown in FIGS. 7A and 7B, the above description is merely an example implementation. In practice, other examples are possible from what is described above in FIGS. 7A and 7B.

Figure 8:
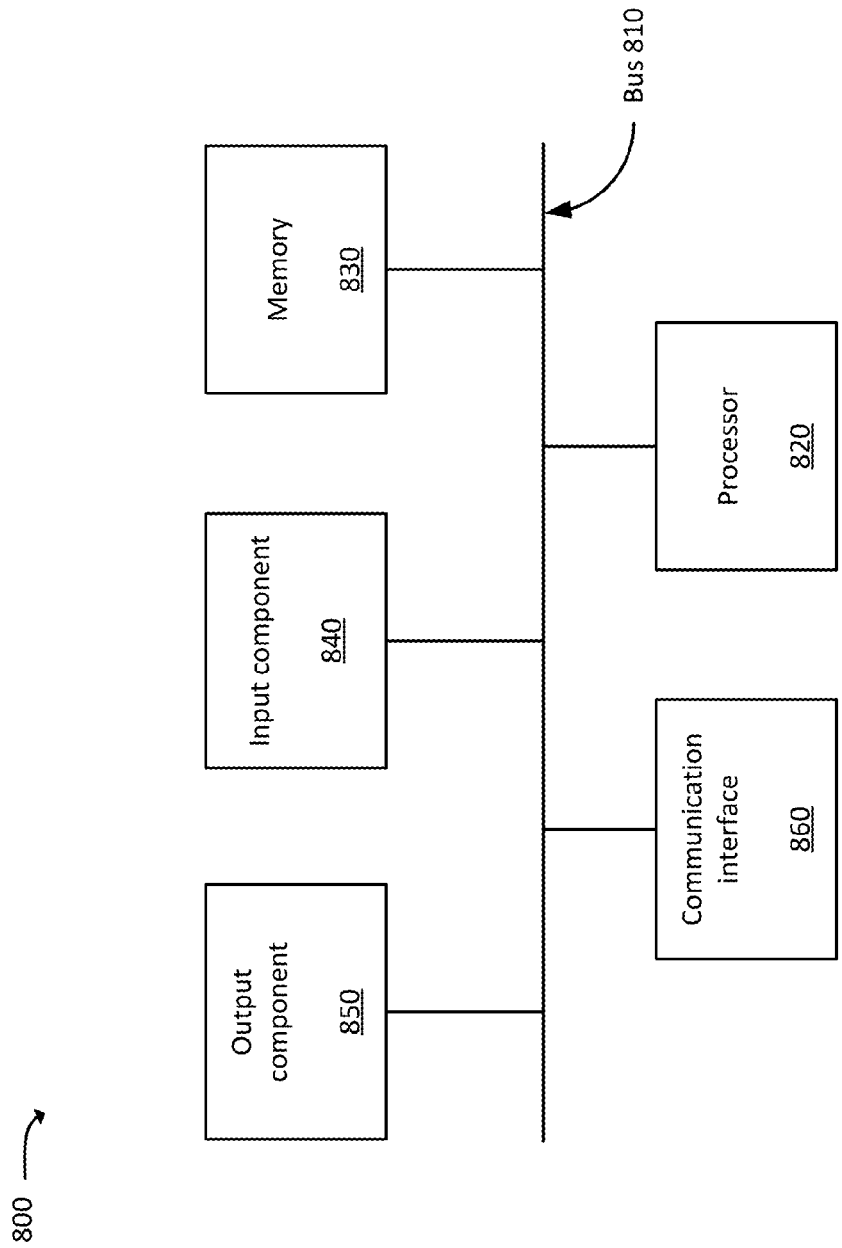
FIG. 8 illustrates example components of one or more devices, according to one or more implementations described herein.

FIG. 8 is a diagram of example components of device 800. One or more of the devices described above (e.g., with respect to FIGS. 1-3) may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio (Bluetooth is a registered trademark of Bluetooth SIG, Inc.), radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 4 and 5, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
storing, by a server device, information identifying a plurality of routes,
   each of the plurality of routes including a sequence in which web pages of a respective route, of the plurality of routes, were selected by users;
assigning, by the server device, amplitude values for each of the web pages, an amplitude value for a particular web page being assigned based on:
   a quantity of times that the particular web page is first selected in the sequences of the plurality of routes,
   quantities that other web pages are first selected in the sequences of the plurality of routes, and
   a comparison of the quantity of times that the particular web page is first selected in the sequences of the plurality of routes and a total quantity of times that the particular web page was selected in the plurality of routes, with the quantities that the other web pages are first selected in the sequences of the plurality of routes and a total quantity that the other web pages were selected in the plurality of routes;
determining, by the server device, respective time-domain functions for each of the plurality of routes, each of the time-domain functions representing a series of amplitude values corresponding to the sequence in which the web pages were selected;
converting, by the server device, the time-domain functions to respective frequency-domain functions for each of the plurality of routes;
determining, by the server device, route metrics for each of the plurality of routes based on the respective frequency-domain functions; and
providing customized web pages, for presentation to a particular user as part of a browsing session, based on the route metrics.

2. The method of claim 1, wherein storing the information identifying the plurality of routes includes:
storing information identifying a number of times that each of the plurality of routes have been selected.

3. The method of claim 1, wherein the route metrics include a correlation coefficient value, a magnitude spectrum mean value, or a phase index value.

4. The method of claim 3, further comprising:
sorting the plurality of routes based on the route metrics, wherein sorting the plurality of routes includes sorting the plurality of routes first by correlation coefficient value, second by magnitude spectrum mean value, and third by phase index value.

5. The method of claim 3, wherein the correlation coefficient value is based on a Pearson Correlation Coefficient Formula.

6. The method of claim 1, further comprising:
determining a base route as the route selected the most out of the plurality of routes,
wherein determining the route metrics for a particular route includes comparing the frequency-domain function of the base route with the frequency-domain function of the particular route.

7. The method of claim 1, wherein the conversion of the time-domain functions to the respective frequency-domain functions is performed using Fast Fourier Transform (FFT) techniques.

8. A system comprising:
a non-transitory memory device storing:
   a plurality of processor-executable instructions, and
   information identifying a plurality of routes,
      each of the plurality of routes including a sequence in which web pages of a respective route, of the plurality of routers, were individually selected; and
a processor configured to execute the processor-executable instructions, wherein executing the processor-executable instructions causes the processor to:
   assign amplitude values for each of the web pages, an amplitude value for a particular web page being assigned based on
      a quantity of times that the particular web page is first selected in the sequences of the plurality of routes, and
      quantities that other web pages are first selected in the sequences of the plurality of routes, and
      a comparison of the quantity of times that the particular web page is first selected in the sequences of the plurality of routes and a total quantity of time that the particular web page was selected in the plurality of routes, with the quantities that the other web pages are first selected in the sequences of the plurality of routes and a total quantity that the other web pages were selected in the plurality of routes;
   determine respective time-domain functions for each of the plurality of routes, each of the time-domain functions representing a series of amplitude values corresponding to the sequence in which the web pages were selected;
   convert, by the server device, the time-domain functions to respective frequency-domain functions for each of the plurality of routes;
   determine route metrics for each of the plurality of routes based on the respective frequency-domain functions; and
   provide customized web pages, for presentation to a particular user as part of a browsing session, based on the route metrics.

9. The system of claim 8, wherein the information identifying the plurality of routes includes:
information identifying a number of times that each of the plurality of routes have been selected.

10. The system of claim 8, wherein the route metrics include a correlation coefficient value, a magnitude spectrum mean value, or a phase index value.

11. The system of claim 10, wherein executing the processor-executable instructions further causes the processor to:
sort the plurality of routes based on the route metrics, wherein sorting the plurality of routes includes sorting the plurality of routes first by correlation coefficient value, second by magnitude spectrum mean value, and third by phase index value.

12. The system of claim 10, wherein the correlation coefficient value is based on a Pearson Correlation Coefficient Formula.

13. The system of claim 8, wherein executing the processor-executable instructions further causes the processor to:

determine a base route as the route selected the most out of the plurality of routes, wherein executing the processor-executable instructions, to determine the route metrics for a particular route, further causes the processor to compare the frequency-domain function of the base route with the frequency-domain function of the particular route.

14. The system of claim 8, wherein the conversion of the time-domain functions to the respective frequency-domain functions is performed using Fast Fourier Transform (FFT) techniques.

15. A method comprising:

receiving, by a server device, a route representing a sequence in which web pages of a web site were visited by a user;

calculating, by a server device, an amplitude value for the web pages of the web site, the amplitude value for each particular web page of the web pages being calculated based on:
- a quantity of times that the particular web page was selected first in a plurality of routes,
- quantities that other web pages are first selected in the plurality of routes, and
- a comparison of the quantity of times that the particular web page was selected first in the plurality of routes and a total quantity of time that the particular web page was selected in the plurality of routes, with the quantities that the other web pages are selected first in the plurality of routes and a total quantity that the other web pages were selected in the plurality of routes;

representing, by the server device, the route as a sequence of the amplitude values corresponding to the web pages in the route;

calculating, by the server device, route metrics for the route based on the sequence of the amplitude values for the route, the route metrics representing a correlation between the route and a particular route of a plurality of routes; and providing customized web pages, for presentation to a particular user as part of a browsing session, based on the route metrics.

16. The method of claim 15, wherein calculating the route metrics includes:

determining a time-domain function representative of the sequence of amplitude values;

converting the time-domain function into a frequency domain function; and comparing the time-domain or the frequency-domain functions of the route with time-domain or the frequency-domain functions of the particular route of the plurality of routes.

17. The method of claim 15, wherein the route metrics include a correlation coefficient value, a magnitude spectrum mean value, or a phase index value.

18. The method of claim 17, wherein sorting the plurality of routes includes sorting the plurality of routes first by correlation coefficient value, second by magnitude spectrum mean value, and third by phase index value.

19. The method of claim 15, wherein customization of the web pages include providing, via the web pages, product recommendations that are determined based on the route metrics.

20. The method of claim 19, further comprising:

determining a base route as the route selected the most out of the plurality of routes, wherein determining the route metrics for the route includes comparing the frequency-domain function of the base route with the frequency-domain function of the route.

* * * * *